US011387009B2

(12) United States Patent
Cinotti

(10) Patent No.: US 11,387,009 B2
(45) Date of Patent: Jul. 12, 2022

(54) NUCLEAR REACTOR PUMP/HEAT EXCHANGER ASSEMBLY

(71) Applicant: HYDROMINE NUCLEAR ENERGY S.A.R.L., Luxembourg (LU)

(72) Inventor: Luciano Cinotti, Recco (IT)

(73) Assignee: HYDROMINE NUCLEAR ENERGY S.A.R.L., Luxembourg (LU)

( * ) Notice: Subject to any disclaimer, the term of this patent is extended or adjusted under 35 U.S.C. 154(b) by 835 days.

(21) Appl. No.: 16/069,000

(22) PCT Filed: Jan. 19, 2017

(86) PCT No.: PCT/IB2017/050287
§ 371 (c)(1),
(2) Date: Jul. 10, 2018

(87) PCT Pub. No.: WO2017/025874
PCT Pub. Date: Jul. 27, 2017

(65) Prior Publication Data
US 2019/0252084 A1    Aug. 15, 2019

(30) Foreign Application Priority Data

Jan. 19, 2016   (IT) .................... 102016000004196

(51) Int. Cl.
*G21C 15/247*    (2006.01)
*F04D 7/06*      (2006.01)
(Continued)

(52) U.S. Cl.
CPC ........... *G21C 15/247* (2013.01); *F04D 7/065* (2013.01); *F04D 7/08* (2013.01); *F04D 29/043* (2013.01); *F22B 1/063* (2013.01)

(58) Field of Classification Search
CPC ........ F04D 7/065; F04D 7/08; F04D 13/0646; F04D 29/043; F22B 1/063; G21C 15/243;
(Continued)

(56) References Cited

U.S. PATENT DOCUMENTS 3,267,868 A * 8/1966 Page ..................... F04D 29/588
                                                              417/370
3,437,559 A * 4/1969 Junkermann ........ G21C 15/243
                                                              376/463
(Continued)

FOREIGN PATENT DOCUMENTS

EP    0150515 A1 * 8/1985 ........... F04D 13/083
FR    1334508 A  * 8/1963 ........... F04D 29/606
(Continued)

OTHER PUBLICATIONS

International Search Report and Written Opinion from International Application No. PCT/IB2017/050287 dated May 4, 2017.

*Primary Examiner* — Jack W Keith
*Assistant Examiner* — Jinney Kil
(74) *Attorney, Agent, or Firm* — Dorsey & Whitney LLP

(57) ABSTRACT

One or more embodiments of the present invention relate to a pump/heat exchanger assembly of a nuclear reactor, in particular a liquid metal cooled nuclear reactor, the pump being characterized in that the shaft for driving the impeller is inserted in an shell inside the heat exchanger and has a smaller cross section at the bottom part of the tube bundle of the heat exchanger and a cross section that gradually increases up to a widest cross section at the top part of the tube bundle of the heat exchanger. The resulting axial profile of the impeller's shaft is, at the same time, designed to uniformly distribute the flow of the primary fluid inside the tube bundle of the heat exchanger and to provide high mechanical inertia to the pump.

8 Claims, 3 Drawing Sheets

(51) Int. Cl.
  *F04D 7/08* (2006.01)
  *F04D 29/043* (2006.01)
  *F22B 1/06* (2006.01)

(58) Field of Classification Search
  CPC ..... G21C 15/247; H01F 7/0247; F29D 29/04; F29D 29/053
  USPC .................................................. 376/404, 406
  See application file for complete search history.

(56) References Cited

U.S. PATENT DOCUMENTS

| | | | |
|---|---|---|---|
| 3,733,151 A * | 5/1973 | Timmons | F04D 29/043 |
| | | | 415/213.1 |
| 4,216,821 A | 8/1980 | Robin | |
| 4,587,093 A * | 5/1986 | Borrman | G21C 3/324 |
| | | | 376/444 |
| 4,597,926 A | 7/1986 | Ando et al. | |
| 6,106,226 A * | 8/2000 | Morando | F04D 7/065 |
| | | | 415/115 |
| 2007/0248454 A1* | 10/2007 | Davis | F04D 5/001 |
| | | | 415/74 |
| 2010/0290579 A1 | 11/2010 | Cinotti | |

FOREIGN PATENT DOCUMENTS

| | | | |
|---|---|---|---|
| WO | 2009024854 A2 | 2/2009 | |
| WO | 2009040644 A2 | 4/2009 | |
| WO | 2016147139 A1 | 9/2016 | |

\* cited by examiner

NUCLEAR REACTOR PUMP/HEAT EXCHANGER ASSEMBLY

TECHNICAL FIELD

The present invention relates to a pump/heat exchanger assembly of a nuclear reactor, in particular a liquid metal cooled nuclear reactor.

In particular, the invention relates to a pump/heat exchanger assembly comprising a primary circulation pump, i.e. operating on a primary cooling fluid of the reactor, and a primary heat exchanger, where the primary fluid circulates and inside which the circulation pump of the primary fluid is housed.

The invention also relates to nuclear reactor, in particular a liquid metal cooled nuclear reactor, equipped with said pump/heat exchanger assembly, operating on the primary cooling fluid of the reactor.

STATE OF THE PRIOR ART

Italian Patent Applications Nos. MI2007A001685 (subsequently extended to International Patent Application WO2009/024854), MI2008A000766 (International Patent Application WO2009/040644) and GE2015A000036 (International Patent Application WO2016/147139) show a pump/heat exchanger assembly of this type, inside which the shaft and the pump impeller are housed.

Document U.S. Pat. No. 4,216,821 also shows a solution of this type.

Such a solution is extremely compact, but not without drawbacks, particularly in terms of primary flow distribution. Since the tube bundle feed is radial, the axial velocity of the primary fluid drops when passing from the bottom to top in the heat exchanger's feed area. This axial velocity drop corresponds to higher pressure and therefore an overpressure in the upper part of the heat exchanger with respect to the lower part.

SUBJECT OF THE INVENTION

One object of the present invention is to provide a pump/heat exchanger assembly for a nuclear reactor that allows overcoming the drawbacks of known solutions and has further safety advantages.

The invention therefore relates to a pump/heat exchanger assembly of a nuclear reactor as defined in appended claim 1, as well as a nuclear reactor as defined in appended claim 6.

Further characteristics of the invention are defined in the dependent claims.

Essentially, the invention is characterized by a specific geometry of the impeller shaft of the pump of the pump/heat exchanger assembly. In fact, according to the invention, the shaft of the impeller has an optimized axial profile so as to overcome the above-mentioned drawbacks of the known art.

BRIEF DESCRIPTION OF DRAWINGS

The invention is described by way of a non-limitative embodiment, with reference to the figures in the accompanying drawings, in which.

PREFERRED EMBODIMENT OF THE INVENTION

Figure 1:
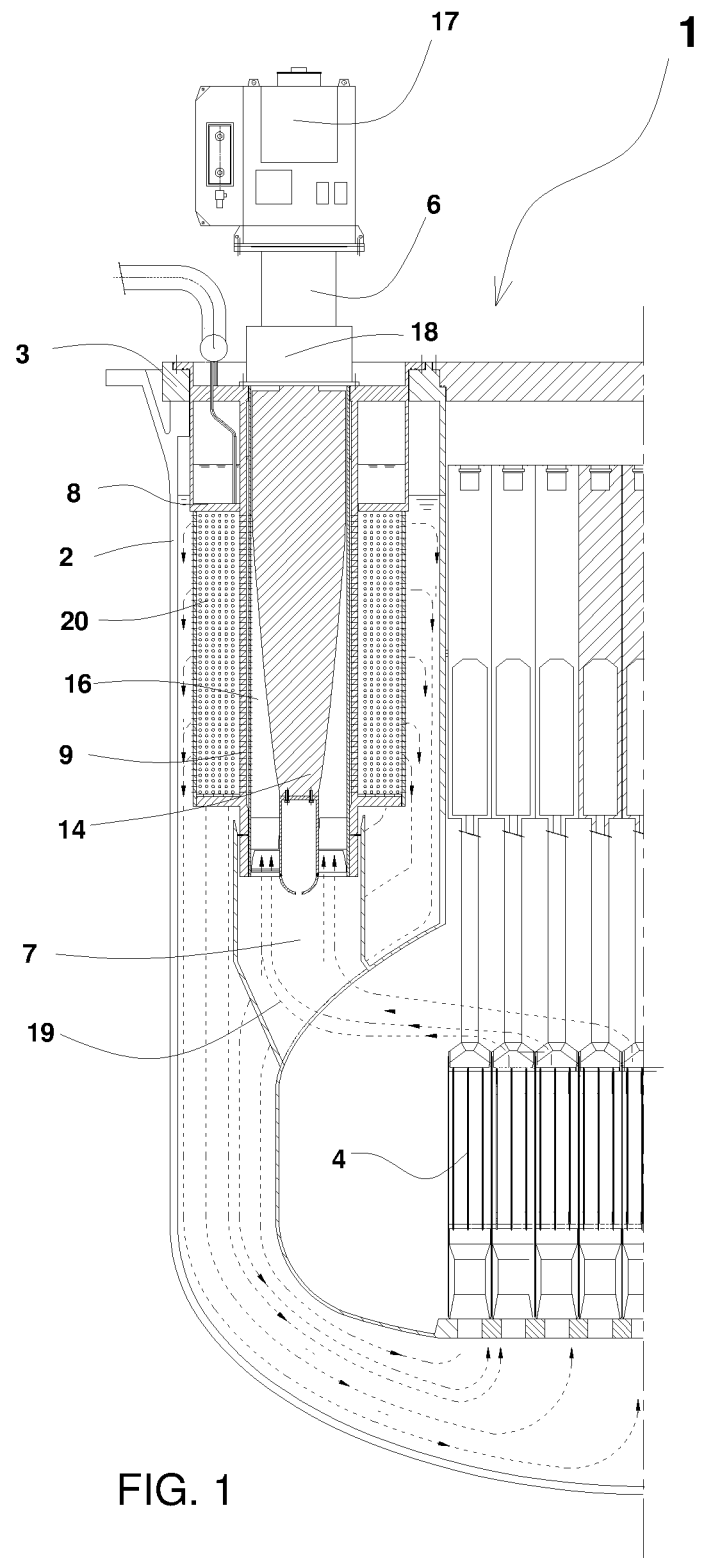
FIG. 1 is a partial schematic view in longitudinal section of a nuclear reactor provided with at least one pump/heat exchanger assembly with an impeller shaft according to the invention.
Figure 2:
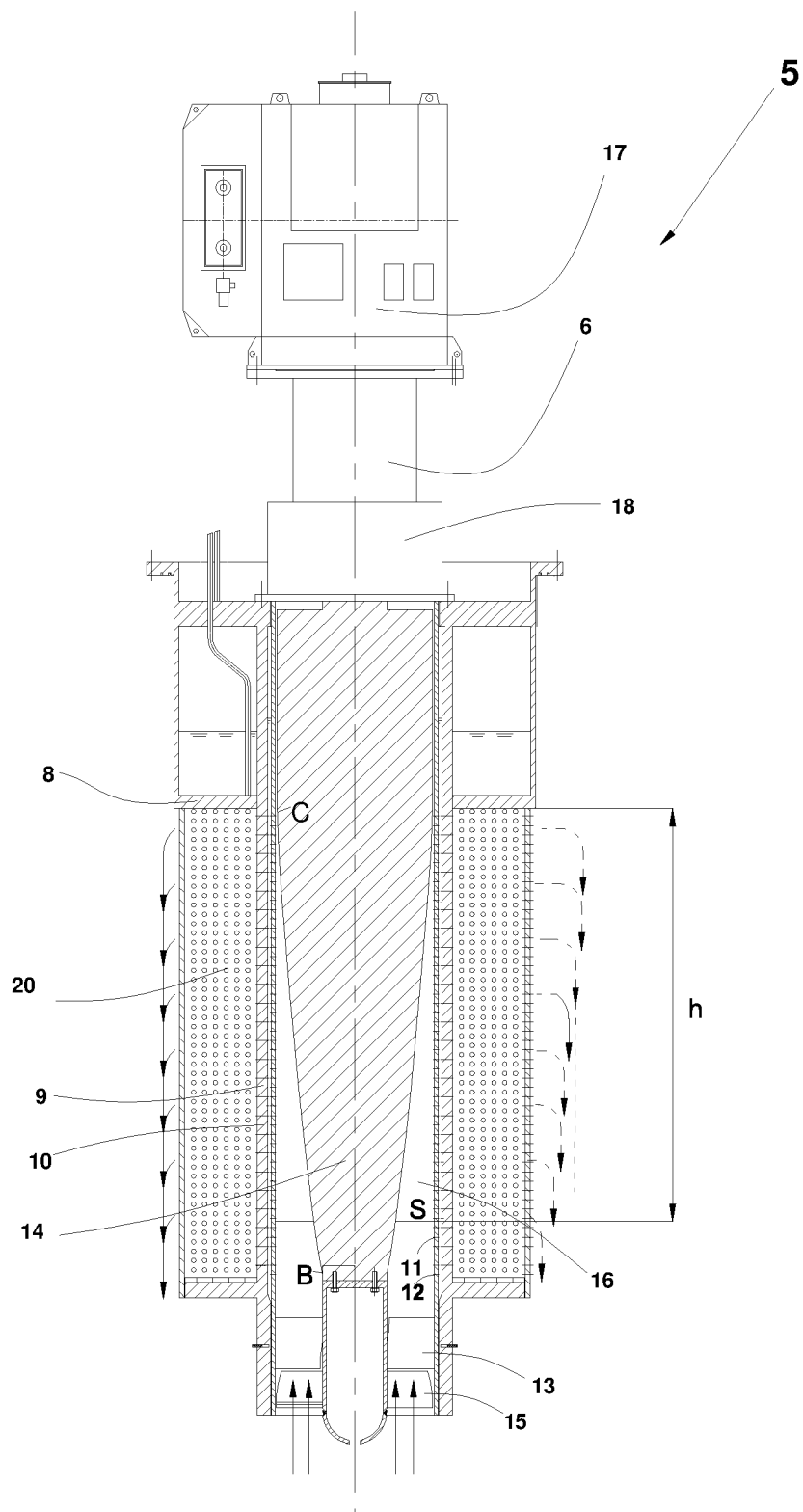
FIG. 2 is a schematic view in longitudinal section and on an enlarged scale of the pump/heat exchanger assembly in FIG. 1.

Referring to FIGS. 1-2, a nuclear reactor 1 comprises a main vessel 2 covered by a roof 3 and containing a core 4. One or more pump/heat exchanger assemblies 5 are housed inside the vessel 2; each pump/heat exchanger assembly 5 comprises a pump 6 for circulating the primary cooling fluid 7 of the reactor 1 and a heat exchanger 8. Preferably, the primary fluid 7 is a heavy liquid metal, for example lead. There is a blanket gas above the primary fluid 7 in the vessel 2.

The heat exchanger 8 is preferably a shell-and-tube heat exchanger and has a tube bundle 20 that occupies an annular region outside an inner shell 9 that is provided with holes 10 and which defines an internal volume where the components of the pump 6 are housed and, in particular, a cylindrical shell 11, provided with holes 12 and which acts as a support of a diffuser 13 of the pump 6, and the shaft 14 of the impeller 15. There is a feed duct 16 between the inside of the cylindrical shell 11 and the outside of the shaft 14. The motor 17 of the pump 6 and mechanical bearings 18 mechanically supporting the shaft 14 are located above the roof 3 of the reactor.

Under normal operating conditions of the reactor 1, the primary fluid 7 leaving the core 4 is conveyed in the connecting duct 19 and, propelled by the impeller 15 of the circulation pump 6, runs bottom-up through the feed duct 16 and then flows through the holes 12 of the cylindrical structure 11, through the holes 10 of the shell 9 and radially through the tube bundle 20.

The pump 6 is characterized by a shaft 14 of the impeller 15 with an axially variable cross-section. The shaft 14 has a minimum diameter at the bottom part of the tube bundle 20 of the heat exchanger 8 and a diameter that increases in the upwards direction up to the top part of the of the tube bundle 20, with a feed duct 16 that consequently has a larger cross-section in the lower part where the flow of the primary fluid is greater and a smaller cross-section in the upper part where the flow is less.

Apart from implementation and design requirements for the tube bundle 20 of the heat exchanger 8, the profile of the shaft 14 of the pump 6 will be shaped to make the section of the duct 16 (intended as the cross-section, orthogonal to the axis of rotation of the shaft 14) approximately proportional to the height h of the portion of tube bundle 20 rising above. For example, the profile of the shaft 14 can be cylindrical below the bottom and above the top levels of the tube bundle 20, and a paraboloid of rotation between point B and point C, respectively corresponding to the bottom and the top level of the tube bundle 20.

Figure 3:
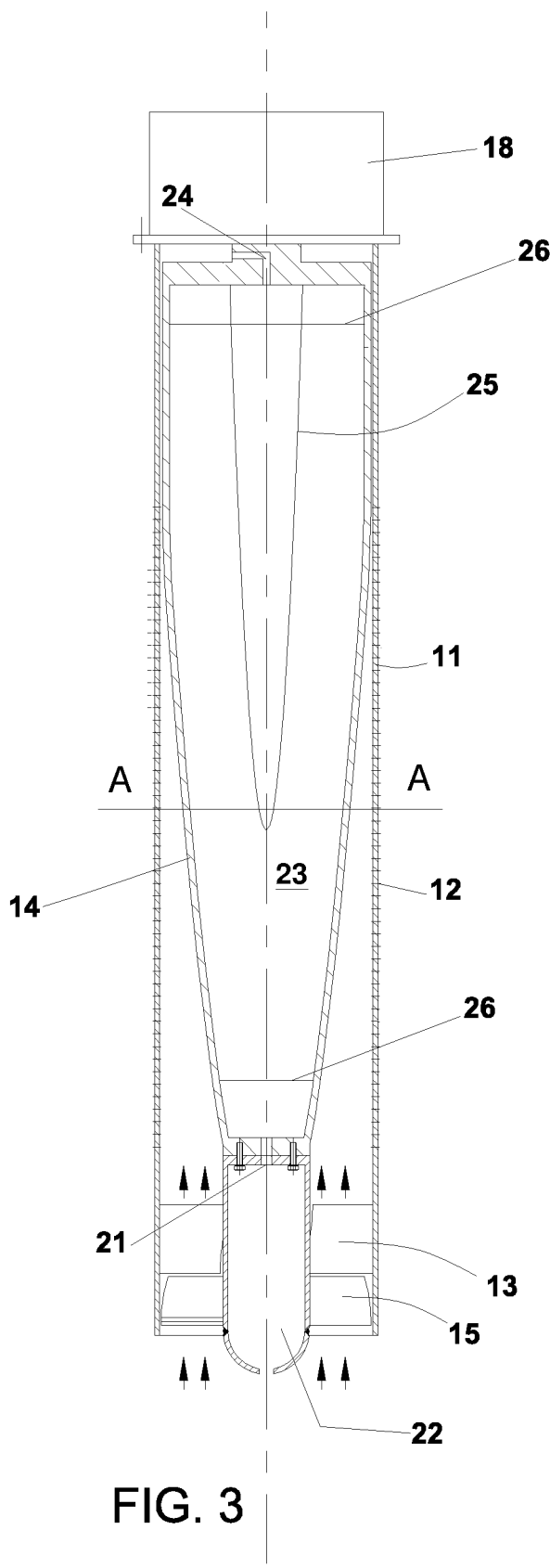
FIG. 3 is a schematic view in longitudinal section of a detail of the pump/heat exchanger assembly in FIG. 2, and shows a different embodiment of the pump's impeller shaft.
Figure 4:
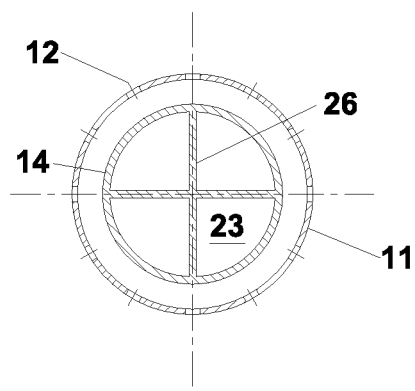
FIG. 4 is a schematic view in cross-section along plane A-A in FIG. 3.

The shaft 14 can be constituted by a solid piece made entirely of a structural material, as shown in FIGS. 1 and 2, or, as shown in detail in FIGS. 3 and 4, the shaft 14 of the pump 6 can be hollow and provided with an internal, longitudinal cavity 23.

In this case, the hollow shaft 14 is axially fitted with a duct 21 in the bottom part to allow, also by means of other ducts 22, the entrance of primary fluid 7 into the cavity 23; a duct 24 is also fitted in the top part to allow the outflow of gas from the top of the reactor 1 and the filling with primary fluid 7 up to profile 25, the shape of which is also a function of the rotational speed of the impeller 15.

Metal plates 26 in a cruciform arrangement and integral with the shaft 14 are provided to integrally entrain the primary fluid contained inside the shaft into rotation.

The advantages of the present invention clearly emerge from the above description.

The pump/heat exchanger assembly 5 constitutes a compact unit.

The shaped profile of the shaft 14 allows calibrating the axial velocity of the primary fluid 7 in the duct 16 in a manner that makes it possible to feed the heat exchangers 8 uniformly. In particular, it is possible to make the upward velocity of the primary fluid 7 in the up-feed duct 16 constant, or adjust it according to the flow distribution requirements of the design for the heat exchanger 8.

The full exploitation of the space inside the shell 11 allows creating a shaft 14 of high mechanical stiffness and inertia. The high mechanical stiffness enables avoiding the use of floating bearings for the pump 6, immersed in the primary fluid; the shaft 14 of the impeller 15 will be supported by just the mechanical bearings 18 placed above the roof of the reactor 3. High mechanical inertia is necessary for a gradual passage from forced to natural circulation of the core 4 in the event of the electrical power supply to the pumps 6 being cut. The high mechanical inertia of the shaft 14 avoids having to add flywheels on the roof 3 of the reactor 1, an area crowded with numerous components.

The hollow shaft 14 that fills with the primary fluid 7 is particularly advantageous for reactors cooled with a high-density primary fluid 7, such as lead, because it simultaneously provides a light shaft and higher mechanical inertia than a solid shaft in steel.

The invention claimed is:

1. A pump/heat exchanger assembly for a nuclear reactor, the pump/heat exchanger assembly comprising:
   a heat exchanger including an internal shell and a tube bundle having a bottom part and a top part; and
   a pump including an impeller and a shaft configured for driving the impeller;
   wherein the shaft is inserted in the internal shell inside the heat exchanger;
   wherein the shaft has a smaller cross section at the bottom part of the tube bundle of the heat exchanger and a cross-section that gradually increases up to a widest cross-section at the top part of the tube bundle of the heat exchanger;
   wherein the shaft has a profile that is cylindrical below the bottom part of the tube bundle and cylindrical above the top part of the tube bundle, and a paraboloid of rotation between the top part and bottom part of the tube bundle.

2. The pump/heat exchanger assembly of claim 1, wherein the shaft has an axial profile shaped like a paraboloid of rotation facing the tube bundle of the heat exchanger.

3. The pump/heat exchanger assembly of claim 1, wherein the shaft is solid and made entirely of a structural material.

4. The pump/heat exchanger assembly of claim 1, wherein the shaft is hollow and is axially provided on an axis of rotation thereof with a first duct in a lower part and a second duct in an upper part, wherein primary coolant enters the first duct and gas from the nuclear reactor outflows from the second duct.

5. The pump/heat exchanger assembly of claim 4, wherein the shaft has an inner cavity provided with cruciform-arranged metal plates integral with the shaft.

6. The pump/heat exchanger assembly of claim 1 wherein the nuclear reactor is configured as a liquid metal cooled nuclear reactor.

7. A nuclear reactor comprising at least one pump/heat exchanger assembly configured as the pump/heat exchanger assembly of claim 1.

8. The nuclear reactor of claim 7 in which the nuclear reactor is configured as a liquid metal cooled nuclear reactor.

* * * * *